(12) United States Patent
Iemura et al.

(10) Patent No.: US 11,016,319 B2
(45) Date of Patent: May 25, 2021

(54) DISPLAY DEVICE MOUNTABLE TO WALL SURFACE

(71) Applicant: SHARP KABUSHIKI KAISHA, Sakai (JP)

(72) Inventors: Hirotoshi Iemura, Sakai (JP); Osamu Abe, Sakai (JP)

(73) Assignee: SHARP KABUSHIKI KAISHA, Sakai (JP)

(*) Notice: Subject to any disclaimer, the term of this patent is extended or adjusted under 35 U.S.C. 154(b) by 27 days.

(21) Appl. No.: 16/207,516

(22) Filed: Dec. 3, 2018

(65) Prior Publication Data

US 2019/0187509 A1 Jun. 20, 2019

(30) Foreign Application Priority Data

Dec. 15, 2017 (JP) .............................. JP2017-241126

(51) Int. Cl.
*G02F 1/1333* (2006.01)
*A47B 97/00* (2006.01)
*A47F 5/08* (2006.01)

(52) U.S. Cl.
CPC ...... *G02F 1/133308* (2013.01); *A47B 97/001* (2013.01); *A47F 5/08* (2013.01); *G02F 1/133314* (2021.01); *G02F 1/133331* (2021.01); *G02F 2201/46* (2013.01)

(58) Field of Classification Search
CPC ..... G02F 1/133308; A47B 97/001; A47F 5/08
See application file for complete search history.

(56) References Cited

U.S. PATENT DOCUMENTS

| 6,020,867 | A | * | 2/2000 | Shimada | G09G 3/3607 345/87 |
|---|---|---|---|---|---|
| 6,688,576 | B2 | | 2/2004 | Oishi et al. | |
| 7,117,621 | B2 | * | 10/2006 | Chang | A47G 1/0616 40/738 |
| 7,766,296 | B2 | * | 8/2010 | Choi | F16M 13/02 248/346.01 |
| 8,008,570 | B2 | * | 8/2011 | Han | G02F 1/133308 84/731 |
| 9,374,927 | B2 | * | 6/2016 | Byeon | G02F 1/133308 |
| 9,416,912 | B2 | * | 8/2016 | Grziwok | A47B 96/06 |
| 2002/0153836 | A1 | | 10/2002 | Oishi et al. | |
| 2003/0217495 | A1 | * | 11/2003 | Nagamine | G09F 9/00 40/605 |

(Continued)

FOREIGN PATENT DOCUMENTS

| CA | 2788427 A1 * | 8/2011 | ............. F16M 11/38 |
| CN | 204181334 U | 3/2015 | |

(Continued)

*Primary Examiner* — Rockshana D Chowdhury
*Assistant Examiner* — Douglas R Burtner
(74) *Attorney, Agent, or Firm* — ScienBiziP, P.C.

(57) ABSTRACT

A display device includes a display panel that displays an image, a back cover disposed on a back face side of the display panel, and a mounting member for fixing the display device to a wall surface. The mounting member is provided in a region extending from a front end of the display panel on a display surface side to a back end of the back cover on the back face side so as to fall within a region of the display device when seen from a side of the display device.

6 Claims, 12 Drawing Sheets

(56) References Cited

U.S. PATENT DOCUMENTS

| | | | |
|---|---|---|---|
| 2005/0127260 A1* | 6/2005 | Dittmer | F16M 11/10 248/221.11 |
| 2006/0060732 A1* | 3/2006 | Tannas, Jr. | G02F 1/1339 248/205.1 |
| 2006/0087804 A1* | 4/2006 | Tsukamoto | G02F 1/133308 361/679.22 |
| 2010/0026913 A1* | 2/2010 | Huang | G02F 1/133308 348/836 |
| 2011/0058112 A1* | 3/2011 | Goetzen | G06F 1/1601 348/836 |
| 2011/0198460 A1* | 8/2011 | Stifal | F16M 13/022 248/201 |
| 2014/0265775 A1* | 9/2014 | Grziwok | F16M 11/2014 312/246 |
| 2015/0192956 A1* | 7/2015 | Whorton | G06F 1/1632 361/679.43 |
| 2015/0226996 A1* | 8/2015 | Ohashi | G02B 6/0011 348/725 |
| 2016/0296018 A1* | 10/2016 | Ahn | F16M 11/041 |
| 2017/0099948 A1* | 4/2017 | Prasad | A47B 97/001 |
| 2017/0105293 A1* | 4/2017 | Kim | H05K 5/0221 |
| 2018/0325288 A1* | 11/2018 | Lervik | A47B 97/001 |
| 2019/0159349 A1* | 5/2019 | Yi | H05K 5/03 |
| 2019/0212606 A1* | 7/2019 | Koda | G02B 6/0051 |

FOREIGN PATENT DOCUMENTS

| | | |
|---|---|---|
| CN | 206460743 U | 9/2017 |
| CN | 206532529 U | 9/2017 |
| JP | 2002-318550 A | 10/2002 |

\* cited by examiner

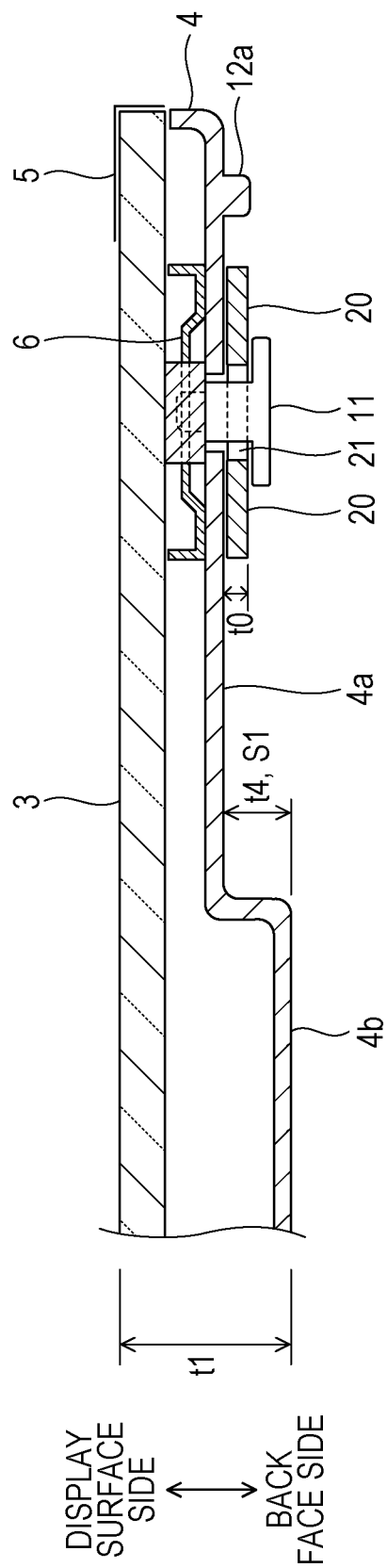

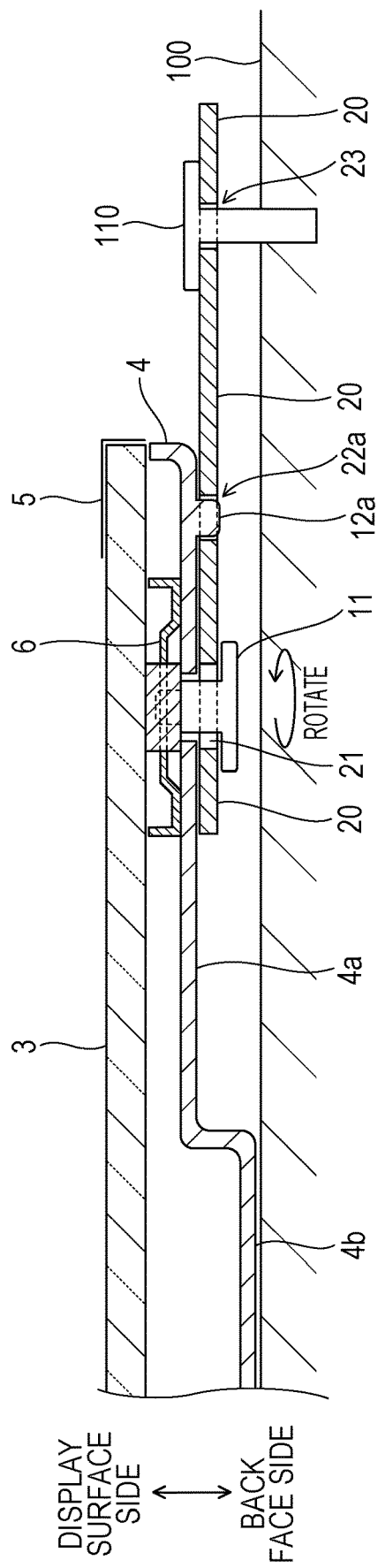

LEFT SIDE ⟵⟶ RIGHT SIDE

BACK FACE SIDE ⟵⟶ DISPLAY SURFACE SIDE

LEFT SIDE ⟵⟶ RIGHT SIDE

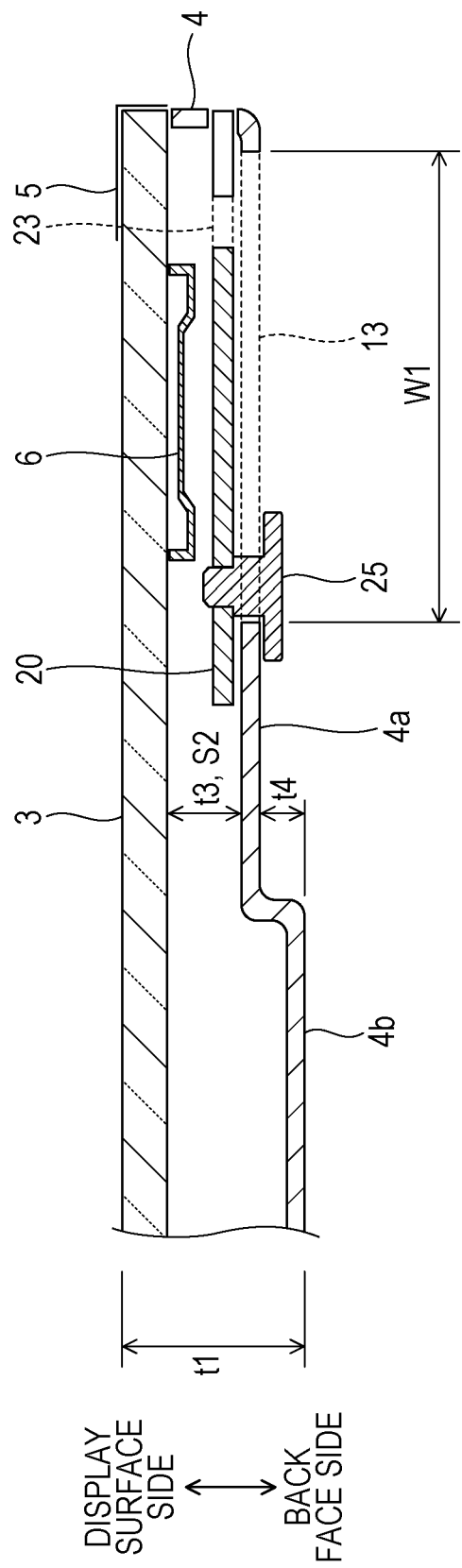

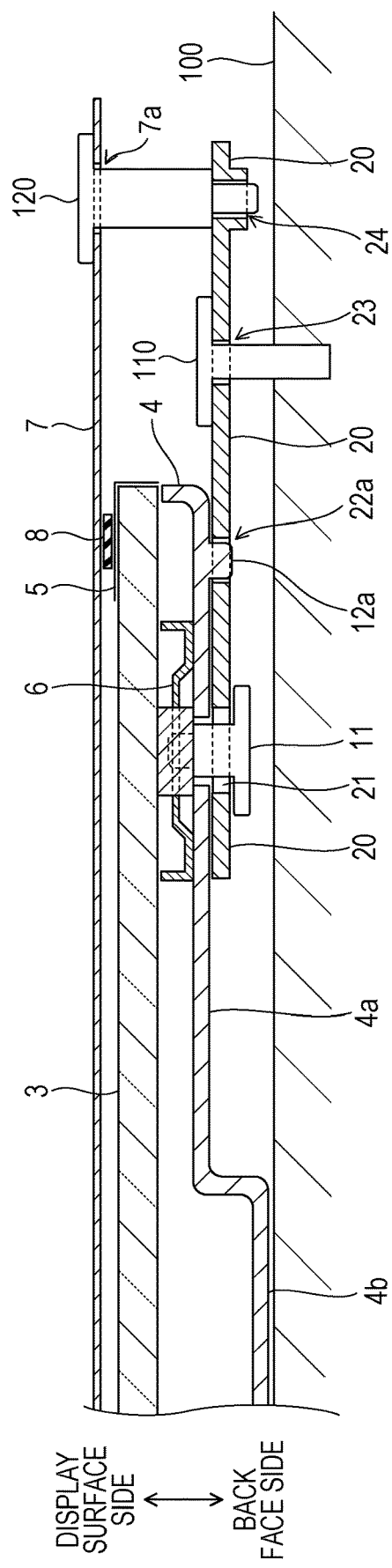

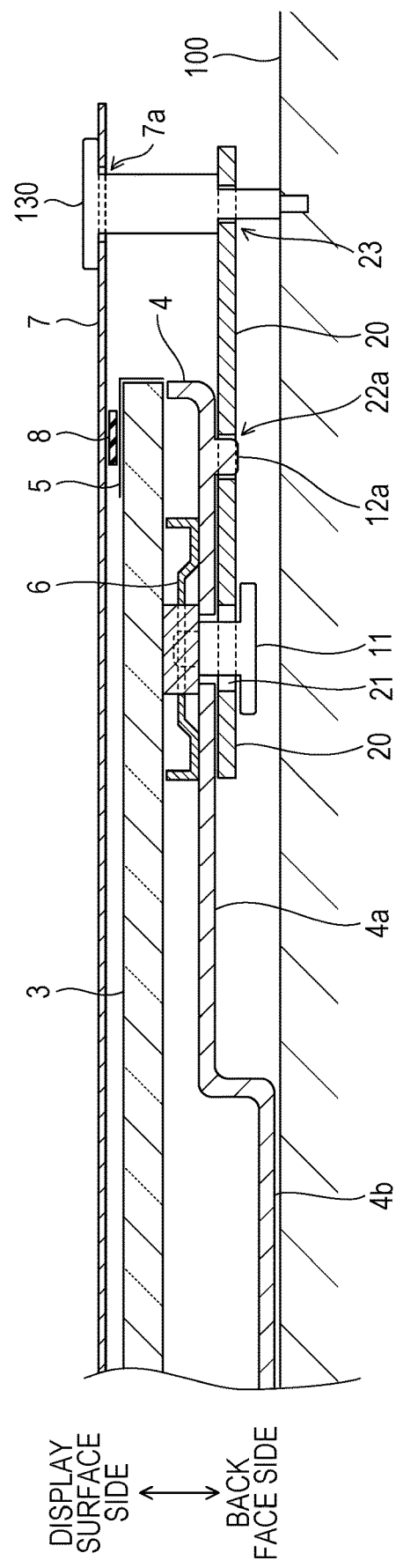

DISPLAY DEVICE MOUNTABLE TO WALL SURFACE

BACKGROUND

1. Field

The present disclosure relates to a display device that is mountable to a wall surface.

2. Description of the Related Art

There have recently been known a system (digital signage) that transmits information using a display device such as a display outdoors, in a public space, in a mean of transportation, or in a similar place. This type of display device is mounted mainly to a wall surface of a facility. In a case where a display device is mounted to a wall surface, the display device is for example screw-fixed to the wall surface using a reinforcing member for use in wall surface mounting. For example, Japanese Unexamined Patent Application Publication No. 2002-318550 discloses a configuration in which a display device is mounted to a wall surface by attaching a reinforcing member to the back face of the display device and then screwing screws shut to the wall surface through mounting holes of the display device and mounting holes of the reinforcing member from the front face of the display device.

However, the conventional technology is configured such that a reinforcing member for use in wall surface mounting is attached to a back cover of the display device and the reinforcing member projects in the direction (depth direction) that is behind the display device. For this reason, mounting the display device to a wall surface results in a great thickness extending from the wall surface to the front face of the display device. Further, mounting the display device to a wall surface entails the work of attaching a reinforcing sheet as a separate member to the display device, resulting in poor workability.

It is desirable to provide a display device that makes it possible to reduce a mounting space and improve the workability of mounting work in a case where the display device is mounted to a wall surface.

SUMMARY

According to an aspect of the disclosure, there is provided a display device including a display panel that displays an image, a back cover disposed on a back face side of the display panel, and a mounting member for fixing the display device to a wall surface. The mounting member is provided in a region extending from a front end of the display panel on a display surface side to a back end of the back cover on the back face side so as to fall within a region of the display device when seen from a side of the display device.

BRIEF DESCRIPTION OF THE DRAWINGS

FIG. 3A is a cross-sectional view taken along line IIIA-IIIA of FIG. 2A;

FIG. 3B is a cross-sectional view taken along line IIIB-IIIB of FIG. 2B;

FIG. 5A is a cross-sectional view taken along line VA-VA of FIG. 1A;

FIG. 7A is a diagram showing a state where a mounting member according to a fourth embodiment of the present disclosure is in a second position;

FIG. 7B is a diagram showing a state where the mounting member according to the fourth embodiment of the present disclosure is in the second position;

DESCRIPTION OF THE EMBODIMENTS

Embodiments of the present disclosure are described below with reference to the accompanying drawings. It should be noted that the following embodiments are examples in which the present disclosure is embodied, and are not characterized as limiting the technical scope of the present disclosure.

First Embodiment

Figure 1A:
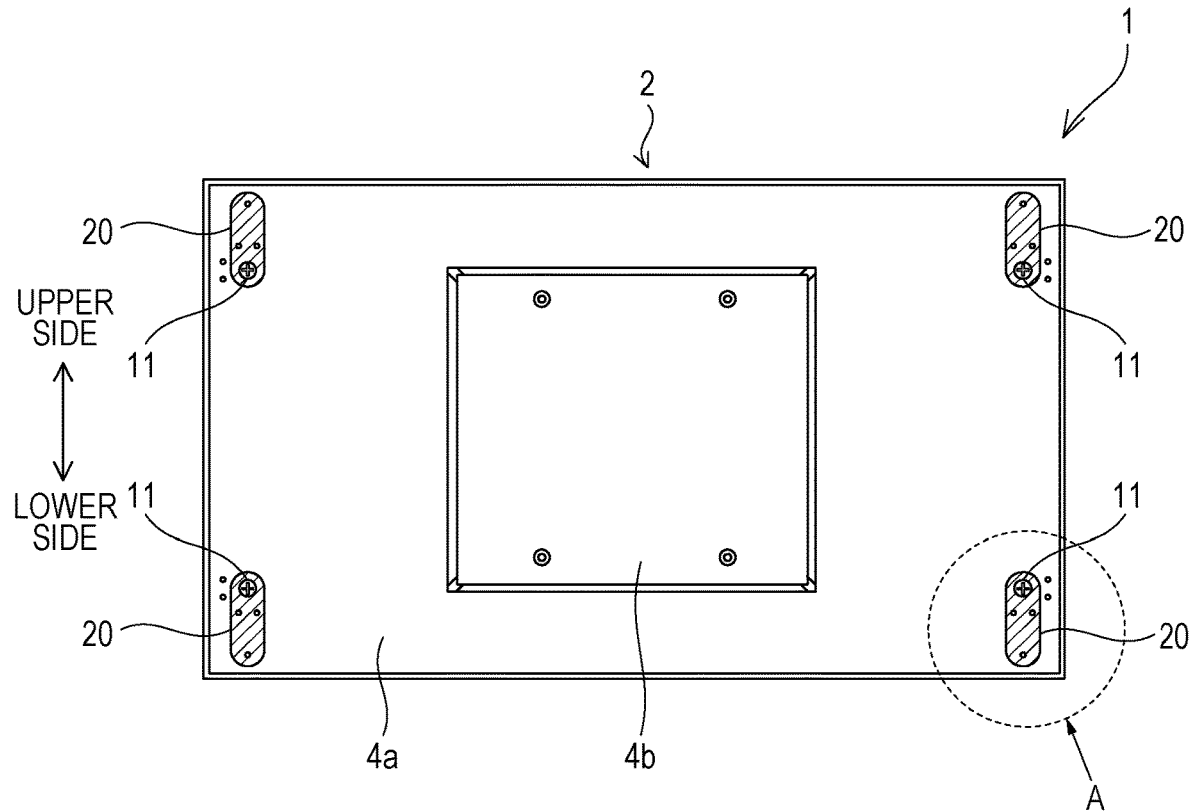
FIG. 1A is a back view schematically showing a configuration of a display device according to a first embodiment of the present disclosure.
Figure 1B:
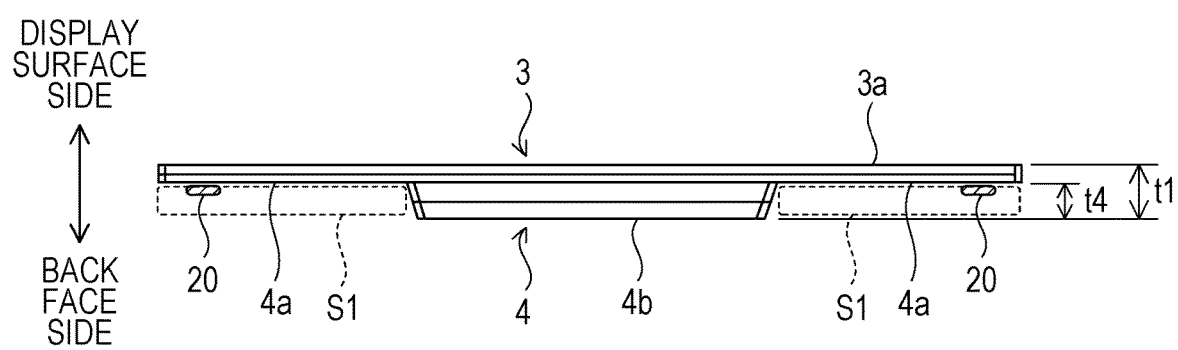
FIG. 1B is a top view schematically showing the configuration of the display device according to the first embodiment of the present disclosure.

FIG. 1A is a back view schematically showing a configuration of a display device 1 according to a first embodiment of the present disclosure, and FIG. 1B is a top view schematically showing the configuration of the display device 1. An example of the display device 1 is a display that is used as digital signage outdoors, in a public space in a mean of transportation, or in a similar place. While the display device 1 is used mainly as the digital signage, it may also be used as a normal display indoors. In a description of second and subsequent embodiments, a description of components which are identical to those of the first embodiment is omitted by giving them the same signs as those of the first embodiment, and a repeated description of their actions and effects is omitted.

As shown in FIGS. 1A and 1B, the display device 1 is mounted, for example, to a wall surface of a facility in a station yard. It should be noted that the term "wall surface" used herein encompasses not only a column or wall of a facility, an architectural construction, or the like but also a column, a wall, or the like of a moving body such as a means of transportation. The following description is given by taking, as an example, a case where the display device 1 is mounted to a wall surface of a facility.

The display device 1 schematically includes a display panel unit 2 and mounting members 20 for mounting the display panel unit 2 to a wall surface. The display panel unit 2 includes a display panel 3 (e.g. a liquid crystal panel) and a back cover 4 that supports the display panel 3 from a back face side.

The display panel 3 displays, on a display surface 3a, an image corresponding to an inputted data signal. Although not illustrated, the display panel 3 includes a pair of substrates (thin-film transistor substrate, color filter substrate), a liquid crystal layer disposed between the substrates, a drive circuit, and a backlight. The display panel 3 has a conventionally well-known configuration. Although the first embodiment illustrates a liquid crystal panel as an example of the display panel 3, a display panel according to the present disclosure may foe example be a plasma display, an organic EL display, or a similar display.

The back cover 4 includes an outer part 4a placed opposite an outer peripheral side of the display panel 3 and an inner part 4b, placed opposite a center side of the display panel 3, that extends (projects) from the outer part 4a to the back face side. The inner part 4b permits, for example, a bracket conforming to the VESA (Video Electronics Standards Association) (registered trademark) standard to be attached thereto. The back cover 4 structurally has a space S1, formed around the inner part 4b, that has a thickness t4 extending from the outer part 4a to the inner part 4b.

The mounting members 20 are constituted, for example, by sheet metal, and have the strength to be able to support the display device 1. The mounting members 20 are provided on the back face side of the display panel unit 2. Specifically, the mounting members 20 are provided within the space S1 of the back cover 4. Further, as shown in FIG. 1A, the mounting members 20 are provided so as not to project outward from an outer peripheral end of the display panel 3, i.e. so as to be accommodatable within a region of the display panel 3, in a plan view of the display panel 3. Further, the mounting members 20 are attached to the outer part 4a of the back cover 4 so as to be rotatable with screws 11 as fulcrums. The mounting members 20 will be described in detail later.

As mentioned above, the display device 1 has its front end serving as the display surface 3a of the display panel 3 on a display surface side and its back end serving as the inner part 4b of the back cover 4 on the back face side. In FIG. 1B, t1 denotes a thickness extending from the display surface 3a (front end) to the inner part 4b (back end). That is, t1 is the outer thickness of the display device 1 in the depth direction. The mounting members 20 are provided at least in a region (within the thickness t1) extending from the front end to the back end. Further, the mounting members 20 fall within a region of the display device 1 as seen from the side of the display device 1.

Figure 2A:
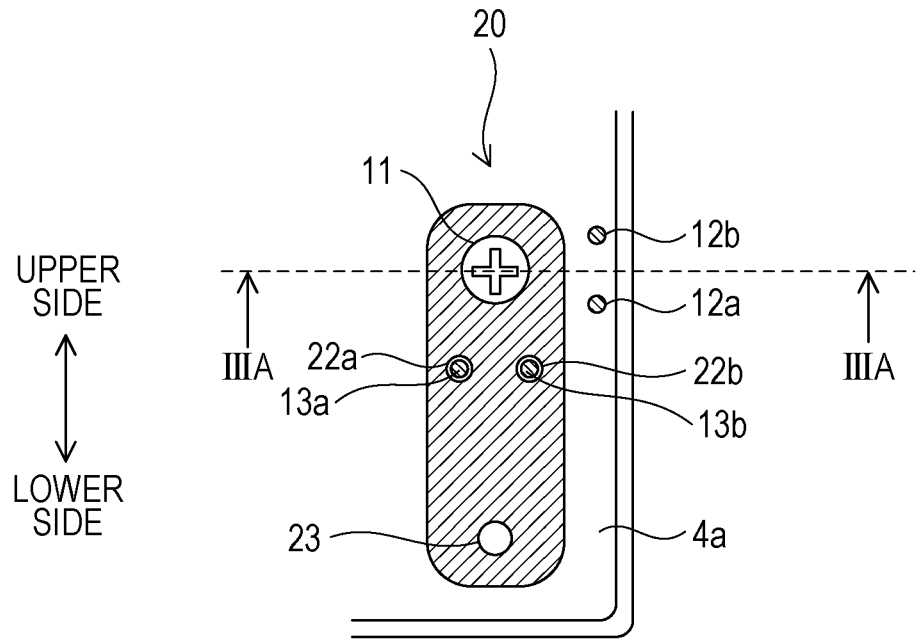
FIG. 2A is a diagram showing a state where a mounting member according to the first embodiment of the present disclosure is in a first position.
Figure 2B:
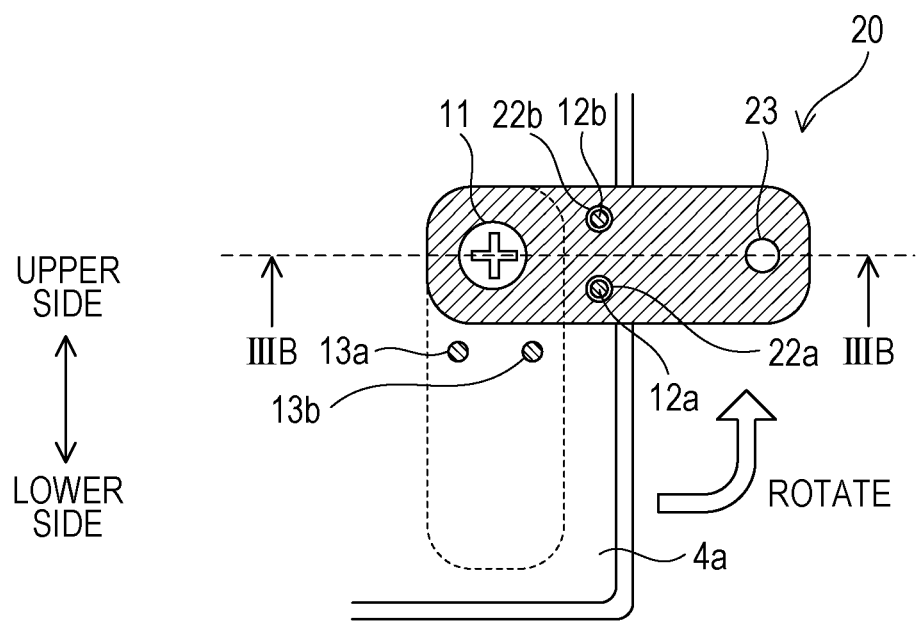
FIG. 2B is a diagram showing a state where the mounting member according to the first embodiment of the present disclosure is in a second position.

FIGS. 2A and 2B are enlarged views of a mounting member 20 in a part (part A) of the display device 1 shown in FIG. 1A. FIG. 2A shows a state where the mounting member 20 is in a position (hereinafter referred to as "first position") prior to shipment of the display device 1, prior to mounting of the display device 1 to a wall surface, or during normal use. FIG. 3A is a cross-sectional view taken along line of FIG. 2A. Further, FIG. 2B shows a state where the mounting member 20 is in a position (hereinafter referred to as "second position") during the work of mounting the display device 1 to a wall surface. FIG. 3B is a cross-sectional view taken along line IIIB-IIIB of FIG. 2B.

As shown in FIGS. 3A and 3B, a front frame 5 is provided at the outer peripheral end of the display panel 3. Further, a reinforcing sheet 6 is provided between the display panel 3 and the back cover 4 so as to extend in a vertical direction (see FIG. 1A). Specifically, the reinforcing sheet 6 is attached to the back face of the display panel 3 in order to secure the strength of the display panel 3.

The mounting member 20 includes a screw hole 21 (see FIGS. 3A and 3B), a screw hole 23 (first screw hole) (see FIGS. 2A and 2B and FIGS. 3A and 3B), and stopper holes 22a and 22b (see FIGS. 2A and 2B). As shown in FIGS. 2A and 2B, the outer part 4a of the back cover 4 is provided with protrusions 12a, 12b, 13a, and 13b. As shown in FIGS. 3A and 3B, the mounting member 20 is fixed to the outer part 4a of the back cover 4 by a screw 11 being screwed shut to the reinforcing sheet 6 through the screw hole 21. The screw 11 is constituted by a shoulder screw, and the mounting member 20 is rendered rotatable by a space that is formed by a shank of the screw 11 having a predetermined length.

As shown in FIG. 2A, in a case where the mounting member 20 is in the first position, the mounting member 20 is fixed to the outer part 4a of the back cover 4 by the protrusions 13a and 13b being fitted into the stopper holes 22a and 22b, respectively. At this point in time, the mounting member 20 is fixed so as to extend in a vertical direction and, when seen in a plan view, falls within the region of the display panel 3. Further, as shown in FIG. 3A, a thickness (distance) t0 extending from the outer part 4a of the back cover 4 to an end of the mounting member 20 is smaller than a thickness (distance) t4 extending from the outer part 4a to the inner part 4b. Since the mounting member 20 is attached so as to be in contact with the outer part 4a, the thickness t0 is substantially equal to the sheet thickness of the mounting member 20.

On the other hand, as shown in FIG. 2B, in a case where the mounting member 20 is in the second position, the mounting member 20 is fixed to the outer part 4a of the back cover 4 by the protrusions 12a and 12b being fitted into the stopper holes 22a and 22b, respectively. FIG. 3B shows how the protrusion 12a is fitted in the stopper hole 22a. As shown in FIG. 2B, in a case where the mounting member 20 is in the second position, the mounting member 20 is fixed so as to extend in a horizontal direction, and a part of the mounting member 20 projects outward from the outer peripheral end (in FIG. 2B, right end) of the display panel 3. Specifically, as shown in FIGS. 2B and 3B, the screw hole 23 of the mounting member 20 stands out of the outer peripheral end of the display panel 3.

The outer dimensions of the screw hole 21 (see FIGS. 3A and 3B) of the mounting member 20, the screw hole 23, and the mounting member 20 are set so that the mounting member 20 entirely falls within the region of the display panel 3 when the mounting member 20 is in the first position and the screw hole 23 of the mounting member 20 stands out of the outer peripheral end of the display panel 3 when the mounting member 20 is in the second position.

The work of moving (work of rotating) the mounting member 20 from the first position (see FIG. 2A) into the second position (see FIG. 2B) and the work of moving (work of rotating) the mounting member 20 from the second position into the first position are for example manually performed by a worker.

For example, in mounting the display device 1 to a wall surface, a worker moves the mounting member 20 of the display device 1 from the first position into the second position upon delivery by rotating the mounting member 20 in the direction of arrows shown in FIGS. 2B and 3B. The worker performs the work on all (in this example, four) mounting members 20.

After having rotated and fixed all mounting members 20 into the second position, the worker screws a fixing screw 110 (first screw) shut to a wall surface 100 through the screw hole 23 of each of the mounting members 20 as shown in FIG. 3B. This makes it possible to mount (fix) the display device 1 to the wall surface 100.

As noted above, the mounting member 20 is disposed in a region between the front end (display surface 3a) of the display panel 3 on the display surface side and the back end (inner part 4b of the back cover 4) of the display panel 3 on the back face side, or more specifically, a region (the space S1 of FIGS. 1A and 3A) between the outer and inner parts 4a and 4b of the back cover 4. For this reason, the outer thickness (t1 shown in FIGS. 1B and 3A) of the display device 1 in a case where the display device 1 is mounted to a wall surface can be made equal to the outer thickness of the display device 1 during normal use. Accordingly, the display device 1 according to the first embodiment only needs a smaller mounting space (amount of projection from a wall surface) than a conventional wall-mounted display device.

Further, the display device 1 according to the first embodiment makes it unnecessary for a worker to attach a separate member (such as a reinforcing member) to the display device 1 in a work area where the worker mounts the display device 1 to a wall surface, making it only necessary to perform the simple work of rotating the mounting member 20, with which the display device 1 is already provided. This brings about improvement in workability as compared with a conventional wall-mounted display device.

Furthermore, the display device 1 according to the first embodiment allows the mounting member 20 to be fixed so as to, when seen in a plan view, project outward from the display panel 3 only when mounted to a wall surface and fall within the region of the display panel 3 during normal use. This prevents the display device 1 from being defiled during normal use. This also makes it unnecessary to manufacture the display device 1 in different structures depending on applications such as normal use and wall-mounted use, making it possible to achieve commonality of structure of the display device 1.

Second Embodiment

Figure 4A:
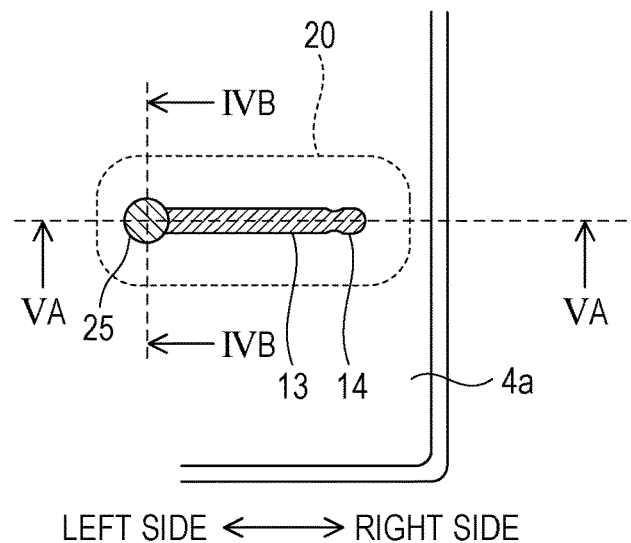
FIG. 4A is a diagram showing a state where a mounting member according to a second embodiment of the present disclosure is in a first position.
Figure 4B:
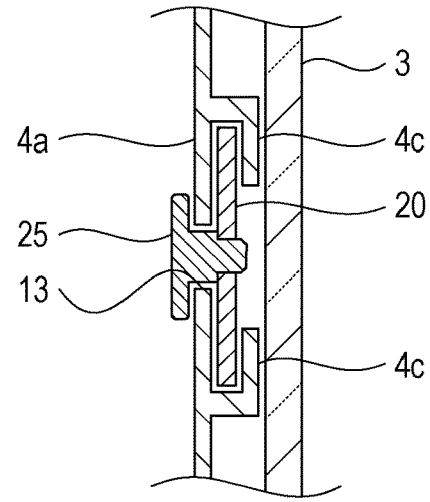
FIG. 4B is a cross-sectional view taken along line IVB-IVB of FIG. 4A.
Figure 4C:
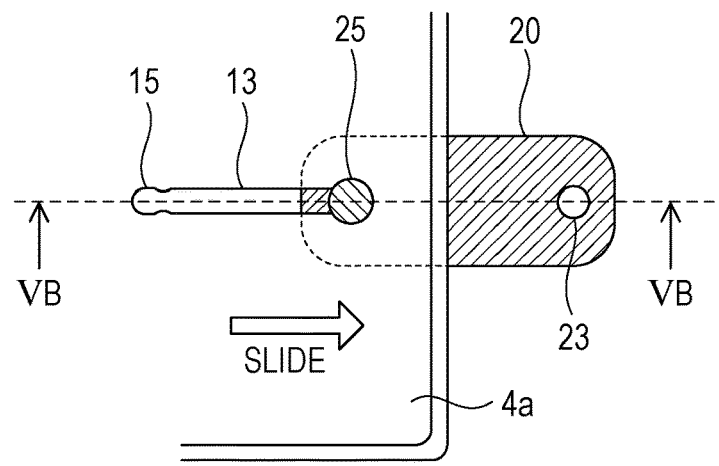
FIG. 4C is a diagram showing a state where the mounting member according to the second embodiment of the present disclosure is in a second position.

FIGS. 4A to 4C are enlarged views of a mounting member 20 of a display device 1 according to a second embodiment. FIGS. 4A to 4C show a part corresponding to part A of FIG. 1A. FIG. 4A shows a state where the mounting member 20 is in a first position, and FIG. 4B is a cross-sectional view taken along line IVB-IVB of FIG. 4A. Further, FIG. 5A is a cross-sectional view taken along line VA-VA of FIG. 4A.

Figure 5B:
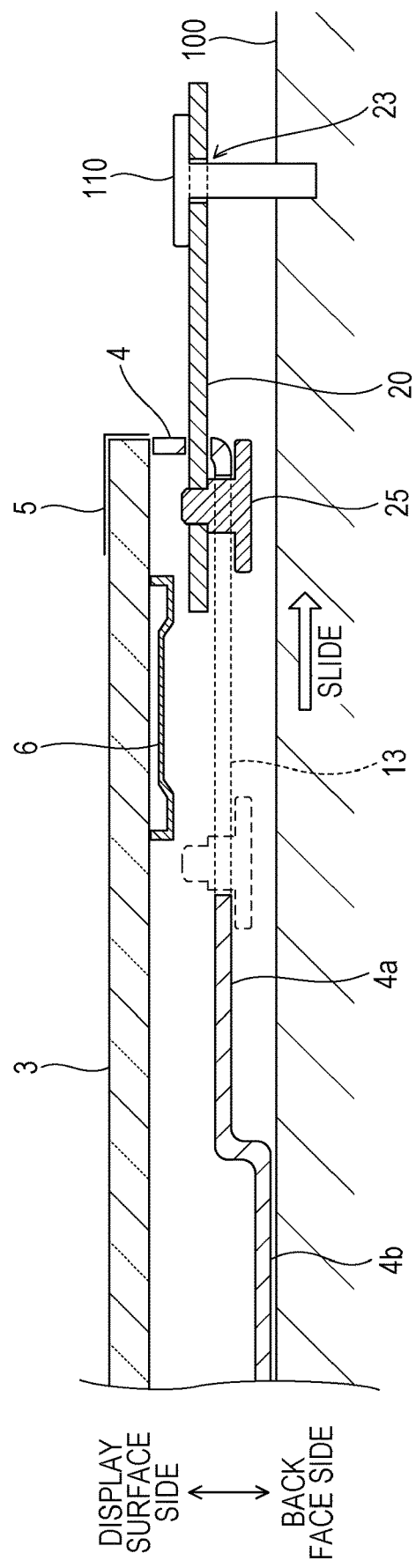
FIG. 5B is a cross-sectional view taken along line VB-VB of FIG. 4C.

FIG. 4C shows a state where the mounting member 20 is in a second position, and FIG. 5B is a cross-sectional view taken along line VB-VB of FIG. 4C.

In the display device 1 according to the second embodiment, as shown in FIG. 4A, the outer part 4a of the back cover 4 has a slit 13 extending in a horizontal direction and stopper holes 14 and 15 provided at both ends, respectively, of the slit 13. Further, as shown in FIG. 4B, the outer part 4a has a receptor 4c formed on the display surface side thereof. The mounting member 20 is disposed to be received by the receptor 4c. Further, a gripper 25 is screwed shut to the mounting member 20 through the slit 13 from the back face side of the outer part 4a. This allows, for example, a worker to, as shown in FIGS. 4A and 4C, hold the gripper 25 to move the mounting member 20 in a horizontal direction between the stopper holes 14 and 15. Thus, the mounting member 20 is movably (slidably) attached to the outer part 4a.

As shown in FIG. 5A, the mounting member 20 is disposed in a region between the display panel 3 and the outer part 4a of the back cover 4. In order for the mounting member 20 to be disposed in the region, a thickness t3 of the region may be increased by reducing the thickness t4 extending from the outer part 4a to the inner part 4b. At this point in time, it is desirable that the outer thickness t1 of the display device 1 in the depth direction be set to be substantially equal no the thickness of an ordinary display device that is not of a wall-mounted type.

As shown in FIG. 4A, in a case where the mounting member 20 is in the first position, the mounting member 20 falls within the region of the display panel 3 when seen in a plan view. On the other hand, as shown in FIG. 4C, in a case where the mounting member 20 is in the second position, a part of the mounting member 20, or specifically, a part of the mounting member 20 including the screw hole 23, projects outward from the outer peripheral end (right end) of the display panel 3 when seen in a plan view.

The work of moving (work of sliding) the mourn ting member 20 from the first position (see FIG. 4A) into the second position (see FIG. 4C) and the work of moving (work of sliding) the mounting member 20 from the second position into the first position are for example manually performed by a worker. For example, in mounting the display device 1 to a wall surface, the worker moves the mounting member 20 of the display device 1 from the first position into the second position upon delivery by sliding the mounting member 20 in the direction of arrows shown in FIGS. 4C and 5B. The worker performs the work on all (in this example, four) mounting members 20.

After having slid and fixed the mounting members 20 into the second position, the worker screws the fixing screw 110 shut to the wall surface 100 through the screw hole 23 of each of the mounting members 20 as shown in FIG. 5B. This makes it possible to mount (fix) the display device 1 to the wall surface 100.

As noted above, the mounting member 20 is disposed in a region between the front end (display surface 3a) of the display panel 3 on the display surface side and the back end (inner part 4b of the back cover 4) of the display panel 3 on the back face side, or more specifically, a region (a space S2 of FIG. 5A) between the display panel 3 and the outer part 4a of the back cover 4. This makes it possible to bring about an effect which is similar to that which is brought about by the display device 1 according to the first embodiment.

Since the display device 1 according to the second embodiment has its mounting members 20 accommodated (contained) between the display panel 3 and the back cover 4, the back cover 4 may be configured such that a thickness extending from the display surface 3a (front end) to the outer part 4a is equal to the thickness t1 extending from the display surface 3a (front end) to the inner part 4b. That is, the back cover 4 may be configured such that t4, shown in FIG. 5A, is set at 0 so that there is no step (projection).

Further, the display device 1 according to the second embodiment is preferably configured such that the mounting members 20 are attached to the back cover 4 in a case where the display device 1 has a light weight and the mounting members 20 are attached to the reinforcing sheet 6 in a case where the display device 1 has a heavy weight.

Third Embodiment

Figure 6A:
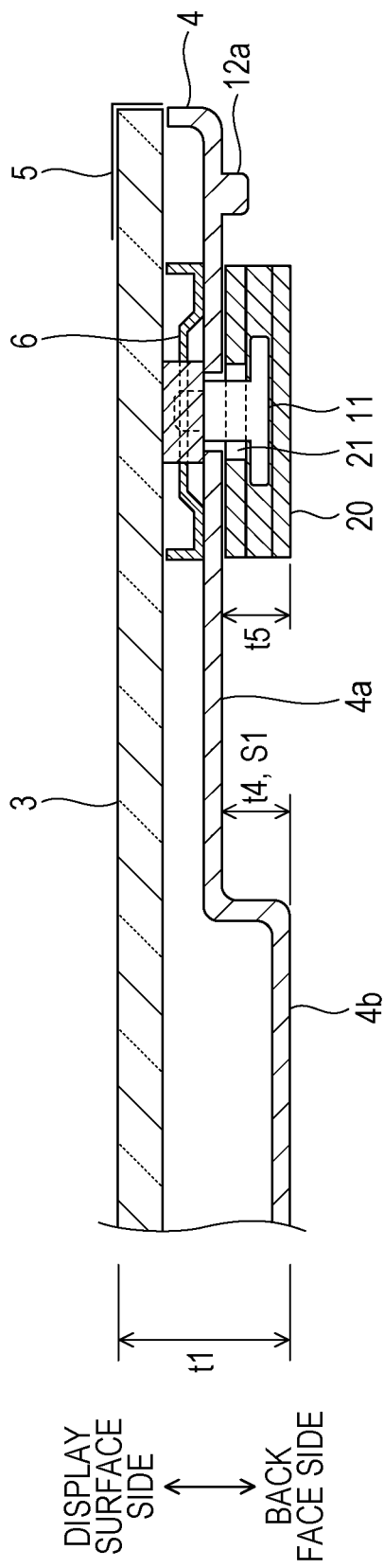
FIG. 6A is a diagram showing a state where a mounting member according to a third embodiment of the present disclosure is in a first position.
Figure 6B:
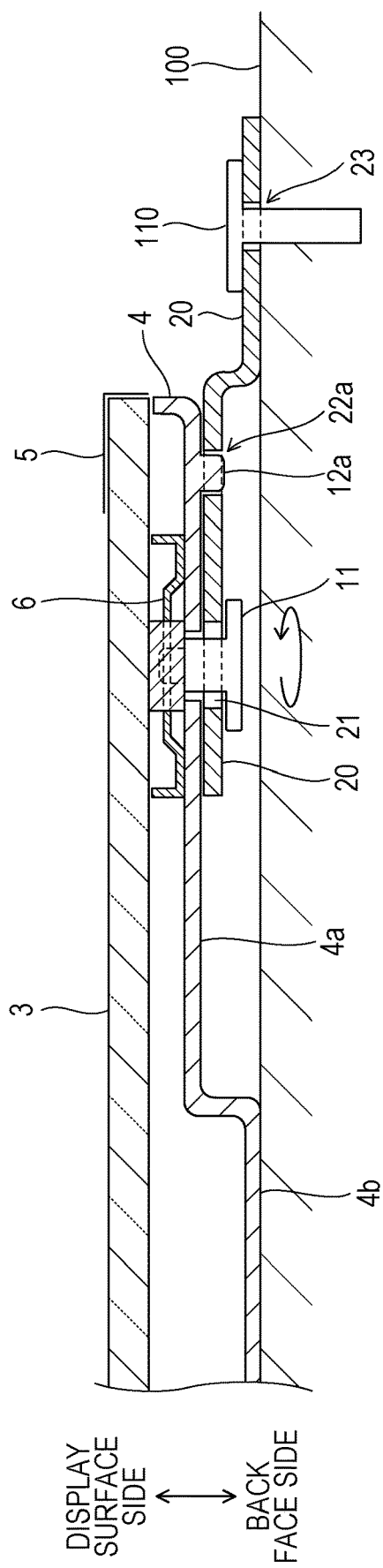
FIG. 6B is a diagram showing a state where the mounting member according to the third embodiment of the present disclosure is in a second position.

FIGS. 6A and 6B are cross-sectional views showing a configuration of a part of a display device 1 according to a third embodiment. FIGS. 6A and 6B show a part corresponding to part A of FIG. 1A. Further, FIG. 6A shows a state where a mounting member 20 is in a first position, and FIG. 6B shows a state where the mounting member 20 is in a second position.

Although a mounting member 20 according to the first embodiment has a flat shape, a mounting member 20 according to the present disclosure is not limited to this shape. As shown in FIG. 6B, a mounting member 20 according to the third embodiment in in the shape of letter Z having a step. A thickness t5 extending from an upper end to a lower end of the mounting member 20 is equal to or smaller than the thickness t4 extending from the outer part 4a to the inner part 4b of the back cover 4 (t5≤t4).

In the configuration of the third embodiment, too, the mounting member 20 is disposed in a region between the front end (display surface 3a) of the display panel 3 on the display surface side and the back end (inner part 4b of the back cover 4) of the display panel 3 on the back face side, or more specifically, a region (the space S1 of FIGS. 1A and 6A) between the outer and inner parts 4a and 4b of the back cover 4. This makes it possible to bring about an effect which is similar to that which is brought about by the display device 1 according to the first embodiment. Further, the display device 1 according to the third embodiment makes it unnecessary to adjust the space between the wall surface 100 and the mounting member 20, as the mounting member 20 can be fixed substantially in contact with the wall surface 100.

As noted above, the shape and outer dimensions of the mounting member 20 are not particularly limited and need only be set, for example, according to the magnitude of the thickness t4 or the size and shape of the fixing screw 110.

Fourth Embodiment

FIGS. 7A and 7B are cross-sectional views showing a configuration of a part of a display device 1 according to a fourth embodiment. FIGS. 7A and 7B show a part corresponding to part A of FIG. 1A. Further, both FIGS. 7A and 7B show a state where a mounting member 20 is in a second position.

The display device 1 according to the fourth embodiment is configured such that the display device 1 according to the first embodiment further includes a protective glass 7 disposed in front of the display panel 3. The protective glass 7 is provided mainly for the purpose of protecting the display surface 3a of the display panel 3. The protective glass 7 is larger in outer dimension than the display panel 3 when seen in a plan view, with a cushion rubber 8 disposed between the protective glass 7 and the display panel 3. The protective glass 7 has screw holes 7a, provided in four corners thereof, through which fixing screws 120 are driven. The protective glass 7 is fixed, for example, by the configuration shown in FIG. 7A or the configuration shown in FIG. 7B.

For example, as shown in FIG. 7A, the mounting member 20 further includes a threaded (tapped) screw hole 24 (screw shutter). The protective glass 7 is fixed to the mounting member 20 by a fixing screw 120 (second screw) being screwed shut to the screw hole 24 through a screw hole 7a (second screw hole). This configuration makes it possible to attach the protective glass 7 to the mounting member 20 after having mounted the display device 1 to the wall surface 100, for example, in accordance with the work procedure shown in the first embodiment. That is, the work of mounting the display device 1 and the work of attaching the protective glass 7 can be separately performed. This makes it possible to improve the workability of the work of replacing the protective glass 7, the work of cleaning the protective glass 7, or similar work, as the protective glass 7 can be removed with the display panel 3 kept mounted to the wall surface 100.

Alternatively, for example, as shown in FIG. 7B, the mounting member 20 may be configured such that the display panel 3 and the protective glass 7 are simultaneously fixed to the wall surface 100 by a shoulder screw 130 being screwed shut to the wall surface 100 through the screw hole 7a of the protective glass 7 and the screw hole 23 of the mounting member 20. This configuration makes it possible to omit the screw hole 24 for use in mounting of the protective glass 7. Further, since the outer dimensions of the display device 1 including the protective glass 7 can be made smaller, footprint requirements can be reduced.

Although the mounting member 20 according to each of the aforementioned embodiments does not include a screw hole 24 for use in mounting of the protective glass 7 (see FIGS. 2A and 2B, FIGS. 4A to 4C, and FIGS. 6A and 6B), the mounting member 20 may include a screw hole 24. This makes it possible to achieve commonalty of parts (mounting members 20) regardless of whether the protective glass 7 is used or is not used.

Figure 8A:
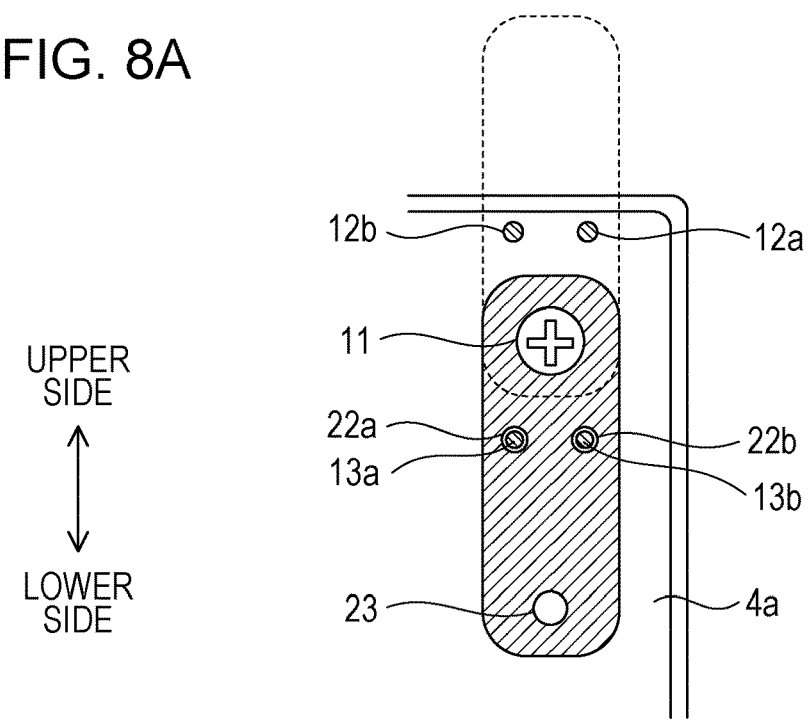
FIG. 8A is a diagram showing a state where a mounting member of a display device according to a modification is in a first position.
Figure 8B:
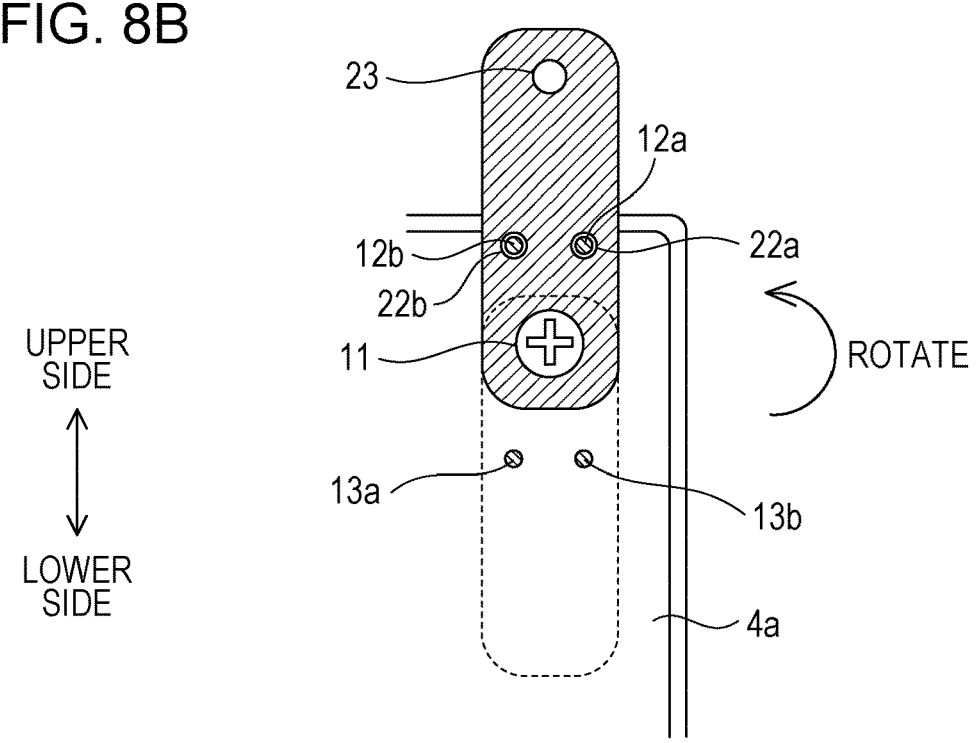
FIG. 8B is a diagram showing a state where the mounting member of the display device according to the modification is in a second position.

A display device 1 according to the present disclosure is not limited to any of the aforementioned embodiments. FIG. 8A is a diagram showing a state where a mounting member 20 of a display device 1 according to a modification is in a first position, and FIG. 8B is a diagram showing a state where the mounting member 20 of the display device 1 according to the modification is in a second position. For example, as shown in FIGS. 8A and 8B, in a case where the display device 1 is mounted to a wall surface, the mounting member 20 may be configured to project toward a higher position than the display panel 3. This configuration makes it possible to mount the display device 1 to the wall surface in such a way that the display device 1 hangs on the mounting member 20.

Further, while each of the embodiments described above is configured such that the mounting member 4 is movably (rotatably or slidably) attached to the back cover 4, the display device 1 according to the present disclosure may be configured such that toe mounting member 20 is immovably fixed to the back cover 4. In this case, the mounting member 20 is fixed to the back cover 4 with the screw hole 23 (see, for example, FIGS. 2B and 4C) standing out of the outer peripheral end of the display panel 3. The configuration eliminates the need for the work of moving the mounting member 20, and is therefore suitable to a wall-mounted display device that is not normally used.

The present disclosure contains subject matter related to that disclosed in Japanese Priority Patent Application JP 2017-241126 filed in the Japan Patent Office on Dec. 13, 2017, the entire contents of which are hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:
1. A display device comprising:
a display panel that displays an image;

a back cover disposed on a back face side of the display panel; and a mounting member for fixing the display device to a wall surface, wherein the back cover includes an outer back-face part and an inner back-face part, the outer back-face part disposed opposite an outer peripheral side of the display panel, the inner back-face part disposed opposite a central portion of the display panel and projecting from the outer back-face part in a backward direction by a width $t4$, a thickness $t0$ of the mounting member in the backward direction is smaller than the width $t4$, and the mounting member is rotatably attached to a surface of the outer back-face part on the back face side in a region of the width $t4$ that extends from the surface of the outer back-face part to a back end of the inner back-face part on the back face side.

2. The display device according to claim 1, wherein the mounting member is attached to the outer back-face part so as to be rotatable from a first position into a second position, in a case where the mounting member is in the first position, the mounting member does not stand out of an outer peripheral end of the display panel in a plan view of the display panel, and in a case where the mounting member is in the second position, a part of the mounting member stands out of the outer peripheral end of the display panel in a plan view of the display panel.

3. The display device according to claim 2, wherein the mounting member includes a first screw hole through which a first screw is driven, so as to be fixed to the wall surface, and in a case where the mounting member is in the second position, the display device is fixed to the wall surface by the mounting member being fixed to the wall surface by the first screw passing through the first screw hole.

4. The display device according to claim 2, further comprising a protective glass disposed in front of the display panel, wherein the mounting member includes a fixing portion for fixing a second screw passing though the protective glass, and the protective glass is fixed to the mounting member by the second screw.

5. The display device according to claim 2, further comprising a protective glass disposed in front of the display panel, wherein the protective glass has a second screw hole in a position opposite the first screw hole, and the mounting member and the protective glass are fixed to the wall surface by the first screw being fixed to the wall surface through both the first screw hole and the second screw hole.

6. The display device according to claim 3, wherein the first screw hole is provided at a portion of the mounting member that stands out of the outer peripheral end of the display panel in a plan view of the display panel in a state where the mounting member is in the second position.

* * * * *